United States Patent Office 3,657,249
Patented Apr. 18, 1972

3,657,249
SYNTHESIS OF NORDIHYDROACRONYCINE AND RELATED COMPOUNDS
Richard N. Booher and Albert Pohland, Indianapolis, Ind., assignors to Eli Lilly and Company, Indianapolis, Ind.
No Drawing. Continuation-in-part of application Ser. No. 653,651, July 17, 1967. This application Oct. 12, 1970, Ser. No. 80,240
Int. Cl. C07d 37/00
U.S. Cl. 260—279 R                  4 Claims

ABSTRACT OF THE DISCLOSURE

Nordihydroacronycine and related compounds are prepared by the reaction of a 1,3-dihydroxy-9-acridone with 1-chloro-3-methyl-2-butene in the presence of a Lewis acid catalyst. Nordihydroacronycine is a useful intermediate in the synthesis of acronycine, an anti-tumor agent.

CROSS-REFERENCE TO RELATED APPLICATIONS

This application is a continuation-in-part of our copending application, Ser. No. 653,651, filed July 17, 1967, now abandoned.

BACKGROUND OF THE INVENTION

Acronycine was first isolated from *Acronychia baueri* by Lahey and co-workers [Nature 162, 223 (1948) and Aust. J. Sci. Res. A2, 423 (1949)]. In 1966, it was determined by MacDonald and Robertson, Aust. J. Chem. 19, 275 (1966) and by Govindachari, Pai and Subramaniam, Tetrahedron 22, 3245 (1966) that acronycine had the following structure:

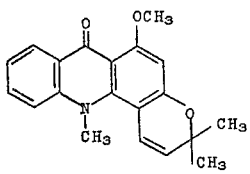

In addition, Govindachari et al. isolated the related compound, noracronycine, in which the group at 6 is hydroxyl instead of methoxyl, des-N-methylacronycine in which the group at 12 is hydrogen instead of methyl, and des-N-methylnoracronycine in which there is a hydroxyl at 6 and a hydrogen at 12. The synthesis of acronycine from noracronycine was described in Aust. J. Sci. Res. A2, 622 (1949).

Recently, it was found by Svoboda and co-workers [J. Pharm. Sci. 55, 758 (1966) and Lloydia 29, 206 (1966)] that acronycine had an extremely powerful anti-tumor action against transplanted tumors in mice, particularly against Shionogi carcinoma, C–1498 myelogenous leukemia, Mecca lymphosarcoma and X–5563 plasma cell myeloma.

SUMMARY OF THE INVENTION

This invention relates to a method for preparing nordihydroacronycine. In particular it relates to a method for preparing nordihydroacronycine and related compounds which comprises the reaction of a 1,3-dihydroxy-9-acridone with a 1-halo-3-methyl-2-butene in the presence of a Lewis acid catalyst.

The present invention is illustrated by the following Reaction Scheme I.

REACTION SCHEME I

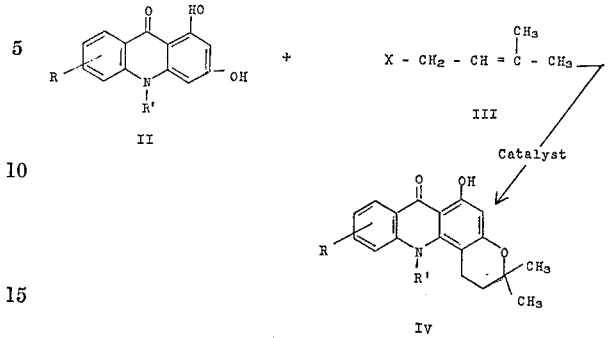

wherein R is hydrogen, halogen, nitro, trifluoromethyl, $C_1$–$C_4$ alkyl or $C_1$–$C_4$ alkyloxy; R' is hydrogen, methyl, ethyl, or benzyl; and X is chloro or bromo. When R is $C_1$–$C_4$ alkyl or $C_1$–$C_4$ alkyloxy, it can be methyl, ethyl, n-propyl, iso-propyl, n-butyl, iso-butyl, sec-butyl, or methoxy, ethoxy, iso-propoxy, iso-butoxy and the like.

The nordihydroacronycine represented by the Formula IV can be converted to acronycine as hereinafter described.

DETAILED DESCRIPTION

According to the present method for preparing a nordihydroacronycine a 1,3-dihydroxy-9-acridone represented by the Formula II, is reacted with a 1-halo-3-methyl-2-butene, preferably 1-chloro-3-methyl-2-butene, in an inert solvent in the presence of an alkylation catalyst of the Lewis acid type. The reaction is carried out at a temperature between about 25 and 150° C. and preferably at a temperature between about 50 and 100° C. in an inert solvent. Inert solvents which can be employed in the instant process include the ethers such as diethyl ether, tetrahydrofuran, methyl iso-butyl ether, dioxane, the dimethyl ether of ethylene glycol and like ethers. The preferred solvent of the present method is tetrahydrofuran. Other solvents, which are unreactive toward the reactants and catalysts employed in the present process, can also be used.

The alkylation catalysts of the Lewis acid type which can be used in the present method for producing a nordihydroacronycine include zinc chloride, stannic chloride, boron trifluoride and like catalysts commonly employed in Friedel-Craft reactions. The preferred alkylation catalyst is zinc chloride.

The starting material in the present method, a 1,3-dihydroxy-9-acridone, represented by the Formula II, is prepared by the method of Drummond and Lahey, Aust. J. Sci. Res. A2, 630 (1949).

As shown by the illustrative Reaction Scheme I, the present method comprises the elaboration of a dihydropyran ring on the tricyclic 1,3-dihydroxy-9-acridone ring structure. A 1,3-dihydroxy-9-acridone is amenable to alkylation of the type here involved at two positions of the dihydroxybenzene ring which can result in the formation of 3 isomers by ring closure with the hydroxy group in the 1-position and the hydroxy group in the 3-position as illustrated by the following formulae.

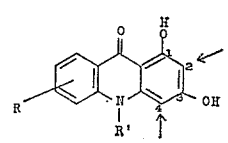

Alkylation in the 2-position can be followed by condensation with either the 1-hydroxy or the 3-hydroxy group to yield the following respective isomers.

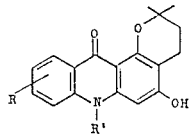 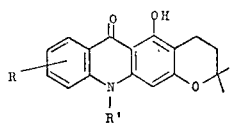

Alkylation in the 4-position followed by condensation with the hydroxy substituent in the 3-position affords the other possible isomer represented by the following formula.

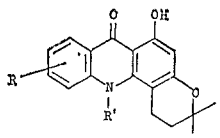

Previously known methods for the elaboration of a dihydropyran ring teach a similar type of alkylation with a phenolic reactant; for example, the preparation of chromanes as described by U.S. Pats. 2,354,317 and 2,421,-812. The present invention however, uniquely provides a selective alkylation of a 1,3-dihydroxy-9-acridone to afford nordihydroacronycine, only one of the 3-isomers which would potentially be produced by the alkylation of a 1,3-dihydroxy-9-acridone.

When, in the above Formula IV, R' is hydrogen, the compound thus prepared is named des-N-methylnordihydroacronycine and can be converted readily to nordihydroacronycine by reaction with methyl iodide or dimethylsulfate in the presence of base. Compounds according to Formula IV in which R' is ethyl or benzyl can similarly be prepared by reaction of the des-N-methylnordihydroacronycine with ethyl iodide, benzyl bromide or the like. Alternatively, of course, the starting acridone can be synthesized by the method of Drummond and Lahey (loc. cit.) so that the group in the 10 position is methyl [R' in (II) is CH₃] in which case the compound is designated 1,3-dihydroxy-10-methyl-9-acridone and the resulting product (IV) is nordihydroacronycine or R' in (II) can be ethyl or benzyl to yield the corresponding nordihydroacronycine derivative. Compounds according to structure (IV) in which R is other than hydrogen are prepared from the corresponding 9-acridone (II) in which R is also other than hydrogen by carrying out the synthesis of Drummond and Lahey (loc. cit.) with starting materials in which the R substituent is already present in the o-iodobenzoic acid reactant which, according to their synthesis, reacts with a 3,5-dimethoxyaniline under Ullmann conditions to yield the corresponding diphenylamine which is then ring-closed to yield an acridone. The des-N-methylnoracronycines [(IV) when R' is H] are useful as intermediates in the synthesis of nordihydroacronycines [(IV) when R' is methyl, ethyl or benzyl]. These latter compounds are in turn useful as intermediates for the synthesis of compounds related to acronycine as set forth in the co-pending application of Beck and Pohland, Ser. No. 653,667, filed July 17, 1967.

This invention is further exemplified by the following specific examples:

EXAMPLE I

Des-N-methylnordihydroacronycine 41.6 grams of 1,3-dihydroxy-9-acridone were heated with 31.4 g. of 1-chloro-3-methyl-2-butene in the presence of 136.3 g. of zinc chloride in 3 liters of tetrahydrofuran at reflux temperature for 3 hours. The tetrahydrofuran was removed by evaporation in vacuo and 1000 ml. of water were added to the residue, which was then extracted with 3000 ml. of ether. Some residual oil remaining in the reaction flask after the above treatment was first treated with 500 ml. of a 5 percent aqueous sodium hydroxide and then extracted with ether. Both ether extracts were combined, washed with water and evaporated in vacuo to yield an oily residue containing des-N-methylnordihydroacronycine. The oily residue was dried by azeotropic distillation, and then dissolved in acetone. Benzene was then added to the acetone solution and the acetone was gradually removed by boiling until a product precipitated. In this manner, 10 g. of des-N-methylnordihydroacronycine melting at about 280°–281° C. were isolated.

The physical and chemical properties of nordihydroacronycine thus prepared are identical with those reported by R. D. Brown et al., Aust. J. Sci. Res. A2, 423 (1949).

EXAMPLE II

Nordihydroacronycine

One gram of des - N - methylnordihydroacronycine prepared as in Example II was reacted with 3 ml. of methyl iodide in the presence of 3 g. of anhydrous potassium carbonate in 70 ml. of acetone. The reaction was carried out by heating at reflux temperature for 5 hours. The acetone was removed by evaporation in vacuo and the resulting residue treated with 50 ml. of water and then extracted with 100 ml. of chloroform. The chloroform extract was dried and evaporated in vacuo to yield nordihydroacronycine melting at about 216–217° C. after recrystallization from ethanol.

EXAMPLE III 8-methyl-des-N-methylnordihydroacronycine

Following the procedure of Example II, 1,3 - dihydroxy - 7 - methyl - 9 - acridone is heated with 1 - chloro-3-methyl-2-butene to yield the 8-methyl derivative of des-N-methylnordihydroacronycine. The starting materials were prepared by the method of Drummond and Lahey (loc. cit.) by substituting 5 - methyl - 2 - iodobenzoic acid for the 2-iodobenzoic acid of that procedure. Also following the above procedure, 1,3 - dihydroxy - 9 - n-propoxy - 9 - acridone was reacted with 1 - chloro - 3 - methyl - 2 - butene to yield the corresponding 8 - n-propoxy derivative of des 1 - N - methylnoracronycine. This latter compound was transformed to the corresponding N-ethyl or N-benzyl derivatives by reaction with ethyl iodide or benzyl bromide in the presence of potassium carbonate.

In a similar manner 9 - chloro - des - N - methylnordihydroacronycine and 9 - trifluoromethyl - des - N-methylnordihydroacronycine are prepared by employing the appropriately substituted 1,3-dihydroxy-9-acridone.

We claim:

1. The method for preparing a compound of the formula

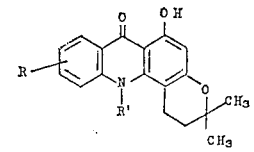

wherein R is hydrogen, halogen, nitro, trifluoromethyl, $C_1$–$C_4$ alkyl or $C_1$–$C_4$ alkyloxy; R' is hydrogen, methyl, ethyl or benzyl; which comprises heating in the presence of a Lewis acid catalyst in an inert solvent a 1-halo-3-methyl-2-butene with a 1,3-dihydroxy acridone of the formula

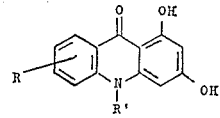

wherein R and R' have the same meanings as defined above.

2. The method of claim 1 wherein 1,3-dihydroxy-9-acridone is heated with 1-chloro-3-methyl-2-butene.

3. The method of claim 1 wherein 1,3-dihydroxy-10-methyl-9-acridone is heated with 1-chloro-3-methyl-2-butene.

4. The method of claim 1 wherein the Lewis acid catalyst is zinc chloride.

References Cited

UNITED STATES PATENTS 2,354,312  7/1944  Hromatka _____ 260—345.2 X
2,421,812  6/1947  Smith _____ 260—345.2

DONALD G. DAUS, Primary Examiner